US006632509B1

(12) United States Patent
Davis et al.

(10) Patent No.: US 6,632,509 B1
(45) Date of Patent: *Oct. 14, 2003

(54) FIRE RETARDANT EPDM ROOFING MEMBRANE COMPOSITONS FOR USE ON HIGH-SLOPED ROOFS

(75) Inventors: James A. Davis, Westfield, IN (US); William F. Barham, Jr., Prescott, AR (US); Gregory A. Brandt, Zionsville, IN (US)

(73) Assignee: BFS Diversified Products, LLC, Carmel, IN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/073,686

(22) Filed: May 6, 1998

(51) Int. Cl.[7] .................. B32B 19/02; B32B 25/02; C08K 3/22; C08K 5/03; C08K 3/34
(52) U.S. Cl. .................. 428/147; 524/412; 524/445; 524/451; 524/464
(58) Field of Search .................. 428/144, 147; 427/387, 393.5, 385.5; 524/412, 445, 449, 451, 464

(56) References Cited

U.S. PATENT DOCUMENTS

| | | | | |
|---|---|---|---|---|
| 4,801,639 A | | 1/1989 | Hoshi et al. ............... 524/112 |
| 4,806,162 A | | 2/1989 | Ladang ..................... 106/18.13 |
| 4,810,565 A | | 3/1989 | Wasitis et al. ............. 428/215 |
| 4,839,412 A | | 6/1989 | Harrell et al. ............. 524/436 |
| 4,851,463 A | | 7/1989 | Opsahl et al. ............. 524/109 |
| 5,260,111 A | * | 11/1993 | Valaitis et al. ............. 428/147 |
| 5,407,989 A | * | 4/1995 | Davis et al. ............... 428/147 |
| 5,468,550 A | | 11/1995 | Davis et al. ............... 428/327 |
| 5,569,516 A | * | 10/1996 | Paeglis et al. ............. 428/147 |

OTHER PUBLICATIONS

Underwriters Laboratories Inc., "Standard for Tests for Fire Resistance of Roof Covering Materials", Oct. 27, 1995.

* cited by examiner

*Primary Examiner*—Peter Szekely
(74) *Attorney, Agent, or Firm*—Rodney L. Skoglund

(57) ABSTRACT

Fire retardant sheeting materials for roofing having improved burn resistivity and are suitable for use on roofs having inclines of at least 1 inch per linear foot. These sheeting materials are prepared from a polymeric composition of matter comprising a base polymer containing at least one ethylene-propylene-diene terpolymer, the base polymer having up to about 2 percent by weight crystallinity; from about 85 to about 175 parts by weight of at least one non-combustible mineral filler per 100 parts of the base polymer; from about 30 to about 50 parts by weight of a processing material, per 100 parts of the base polymer; from about 50 to about 80 parts by weight of at least one fire retardant additive, per 100 parts of the base polymer; and from about 1.5 to about 10 parts by weight of a sulfur cure package per 100 parts of the base polymer. The composition contains at least 40 percent non-combustible materials, and the sheeting material has a limiting oxygen index (LOI) of at least 40 percent when tested in accordance with ASTM D2863-91. A method of covering a roof comprises the steps of applying layers of the fire retardant roof sheeting material prepared from the polymeric composition of matter, to the roof being covered, overlapping adjacent edges of the roof sheet material, and adhesively seaming the overlapped layers of the roof sheet material together to form a continuous roofing membrane.

20 Claims, No Drawings

FIRE RETARDANT EPDM ROOFING MEMBRANE COMPOSITONS FOR USE ON HIGH-SLOPED ROOFS

TECHNICAL FIELD

The present invention relates generally to fire retardant sheeting materials and, more particularly, to fire retardant EPDM-based roofing membranes exhibiting such an improved burn resistivity that they are suitable for use on roofs having high slopes. Specifically, these preferably scrim-reinforced, fire retardant EPDM roofing membranes have relatively low process oil loadings, relatively high levels of non-combustible mineral fillers, and a fire retardant package containing at least decabromodiphenyl oxide (DBDPO) or similar bromine-containing additives and antimony trioxide ($Sb_2O_3$) such that the roofing membranes have a limiting oxygen index (LOI) of at least 40 percent oxygen when tested in accordance with ASTM D2863-91.

BACKGROUND OF THE INVENTION

Ethylene-propylene-diene terpolymer (EPDM) is extensively utilized in a variety of applications. For example, it is particularly useful as a polymeric rubber sheeting material which, because of its excellent physical properties, flexibility, weathering resistance and heat aging resistance, has gained acceptance as a single-ply roofing membrane for covering industrial and commercial flat roofs. Such roofing membranes are typically applied to the roof surface in a vulcanized or cured state and serve as an effective barrier to prevent the penetration of moisture through the roof being covered.

These EPDM roofing membranes typically are prepared by compounding the EPDM or mixtures of EPDM and other polymers, such as ethylene-propylene copolymers (EPM) or ethylene-butene copolymers, with the appropriate reinforcing and non-reinforcing fillers, processing oils, and other desired ingredients, such as plasticizers, antidegradants, crystallinity-enhancing promoters, adhesive-enhancing promoters, etc., in a suitable internal mixer, and calendering the resulting compound into the desired rubber sheet. The roofing membranes may then be cured, if desired, by vulcanizing the resultant composite sheet in the presence of one or more vulcanizing agents and/or compatible vulcanizing accelerators. Vulcanizing agents such as sulfur or sulfur containing compounds such as mercaptans are normally used today, although vulcanization and curing can be done using other agents or in the presence of other compounds. For example, ethylene-butene copolymers may be cured in the presence of a triazine or organic peroxide. As another alternative, curing by ionizing radiation through the use of radiation crosslinking promoters has also been suggested.

One major drawback of EPDM-based sheeting materials, and roofing membranes in particular, are that they lack flame resistance or burn resistivity. In other words, EPDMs, like other olefinic elastomers, are combustible, and the roofing membranes are not fire-proof. At least one test has been set forth as an American Standard Testing Method (ASTM) in order to compare the flame resistance or burn resistivity of various compositions. In particular, ASTM D2863-91 provides for a determination of the limiting oxygen index (LOI) which, generally speaking, correlates to the burn resistivity of a composition. That is generally, the higher the LOI is, the greater the burn resistivity of the composition.

The LOI is determined by measuring the minimum concentration of oxygen in a flowing mixture of oxygen and nitrogen that will just support flaming combustion of either rubber or plastic materials.

In the past, typical EPDM-based roofing membranes exhibited relatively low LOI values, typically on the order of about 18 to 22 percent oxygen, while molded plaques of the raw polymer itself had LOI values of between about 18 and 19 percent oxygen. These roofing membranes contained several combustible materials and were readily flammable when ignited.

In order to improve the flame resistance or burn resistivity of products employing olefinic elastomers, e.g., EPDM roofing membranes, flame retardant fillers such as antimony trioxide, decabromodiphenyl oxide (DBDPO), dechlorane (chlorinated alicyclic hydrocarbon), alumina trihydrate, and chlorinated or brominated paraffins, have been introduced and incorporated into the composition of the product, as shown in U.S. Pat. Nos. 4,839,412 and 4,851,463. However, it will be appreciated that the capacity of some of those products, and particularly olefinic roofing membranes that exhibit thermoplastic characteristics, to accept these flame retardant fillers is somewhat limited. Excessive amounts of the fillers will often result in a loss of physical properties, flexibility and/or even processibility.

Thus, while flame retardant fillers have often been used in polymeric sheeting and roofing membranes to increase flame resistance and burn resistivity, the amount of flame retardant fillers that can be added is necessarily limited, and therefore, the burn resistivity of a product containing these flame retardant fillers is also limited. In essence, while attempts have been made to improve the flame resistance or burn resistivity of EPDM-based roofing membranes, the art has not, heretofore, found a way to increase the flame resistance such that the roof sheeting membranes have a limiting oxygen index (LOI) of at least 40 percent when tested in accordance with ASTM D2863-91. It has been found that in order to provide a roofing membrane that meets or exceeds national flammability testing standards for roof covering materials such as Underwriter Laboratory's UL-790 Test for Fire Resistance of Roof Covering Materials for all roofs, including those having high slopes, and particularly, for use on sloped roofs having an incline of 1 inch or more per linear foot, an LOI of at least 40 percent oxygen when tested in accordance with ASTM D2863-91 is necessary.

Prior art roofing membranes have not met such standards when applied to such high sloped roofs. For example, U.S. Pat. No. 4,810,565 discloses a fire retardant elastomeric EPDM roof sheeting composite comprising an upper layer of a fire retardant EPDM material and a lower layer of a non-fire retardant EPDM material. Among its advantages, this patent notes the elimination of the use of subsequently-applied coatings as a necessary means of enabling standard EPDM materials to pass testing standard UL-790 in some roofing assemblies. While this is true for roofing membranes developed for essentially flat roofs, i.e., those roofs having inclines of less than 1 inch per linear foot, it is believed that the composite sheet does not pass testing standard UL-790 on high-sloped roofs, i.e., those roofs having inclines of 1 inch per linear foot or greater. In fact, as set forth hereinbelow, even the preferred fire retardant EPDM material employed as the upper layer of the composite alone (without its lower layer) does not have an LOI of 40 percent oxygen when tested in accordance with ASTM D2863-91.

Therefore, while the use of flame retardant additives offer effective means of increasing flame or burn resistivity, these additives cannot be provided in great enough quantity to effectively render all EPDM roofing membranes unflammable, particularly on high sloped roofs. Thus, the need exists for an EPDM roofing membrane composition with a limiting oxygen index (LOI) of at least 40 when tested in accordance with ASTM D2863-91, such that the EPDM roofing membrane composition meets or exceeds testing standard UL-790 for roofs having slopes of 1 inch per linear foot or more. Moreover, physical properties of the roofing membrane should not change significantly.

SUMMARY OF THE INVENTION

It is thus an object of the present invention to provide vulcanizable elastomeric roof sheeting materials that possess improved burn resistivity.

It is another object of the present invention to provide vulcanizable elastomeric roof sheeting materials that possess improved burn resistivity in high slope uses.

It is yet another object of the present invention to provide vulcanizable elastomeric roof sheeting materials, as above, that have a limiting oxygen index of at least 40 percent oxygen when tested in accordance with ASTM D2863-91.

It is still another object of the present invention to provide vulcanizable elastomeric roof sheeting materials, as above, that exhibit superior long-term heat aging, ozone and weathering resistance.

It is still another object of the present invention to provide vulcanizable elastomeric roof sheeting materials, as above, that will successfully pass fire standard UL-790 Test for Fire Resistance for Roof Covering Materials for use of roofs of unlimited slopes.

It is yet another object of the present invention to provide vulcanizable elastomeric roof sheeting materials that possess improved dimensional stability.

It is yet another object of the present invention to provide vulcanizable elastomeric roof sheeting materials from uncured membrane compounds that possesses Mooney viscosities of about 37 to 43 Mooney units at 135° C.

It is a further object of the present invention to provide a method for covering roofs which employs vulcanizable elastomeric roof sheeting materials possessing improved burn resistivity in high slope uses.

In general the present invention provides a fire retardant sheeting material for roofing comprising: a base polymer containing at least one ethylene-propylene-diene terpolymer, the base polymer having up to about 2 percent by weight crystallinity; from about 85 to about 175 parts by weight of at least one non-combustible mineral filler per 100 parts of the base polymer; from about 30 to about 50 parts by weight of a processing material, per 100 parts of the base polymer; from about 50 to about 80 parts by weight of at least one fire retardant additive package, per 100 parts of the base polymer; and from about 1.5 to about 10 parts by weight of a sulfur cure package per 100 parts of the base polymer, the sheeting material containing at least 40 percent non-combustible materials and having a limiting oxygen index (LOI) of at least 40 when tested in accordance with ASTM D2863-91.

The present invention also provides a method for covering a roof comprising: applying layers of vulcanizable elastomeric roof sheeting material prepared from a fire retardant polymeric composition of matter to the roof being covered, the polymeric composition of matter comprising a base polymer containing at least one ethylene-propylene-diene terpolymer, the base polymer having up to about 2 percent by weight crystallinity; from about 85 to about 175 parts by weight of at least one non-combustible mineral filler per 100 parts of the base polymer; from about 30 to about 50 parts by weight of a processing material, per 100 parts of the base polymer; from about 50 to about 80 parts by weight of at least one fire retardant additive, per 100 parts of the base polymer; and from about 1.5 to about 10 parts by weight of a sulfur cure package per 100 parts of the base polymer; overlapping adjacent edges of the layers; and adhesively seaming the overlapped areas to form an acceptable seam, the composition of matter containing at least 40 percent non-combustible materials and the sheeting material having a limiting oxygen index (LOI) of at least 40 when tested in accordance with ASTM D2863-91.

At least one or more of the foregoing objects which shall become apparent to those skilled in the art are described in greater detail with reference to the specification which follows.

PREFERRED EMBODIMENT OF THE INVENTION

As noted hereinabove, the present invention is directed toward fire retardant elastomeric sheeting materials for roofing and, more particularly, for those sheeting materials suitable for use on roofs having high slopes or inclines of at least 1 inch per linear foot and more preferably, about 3 inches per linear foot. Heretofore, no EPDM-based roof sheeting material for high-sloped roofs has been able to withstand the extreme conditions set forth in UL-790 as a national fire standard. In fact, it is believed that no EPDM-based roof sheeting material has ever attained an LOI of at least 40 percent oxygen when tested in accordance with ASTM D2863-91. The roof sheeting materials of the present invention meet these standards.

The roof sheeting materials of the present invention comprise EPDM as the base polymer, and may optionally include up to about 20 percent EPM in replacement of the EPDM. The term EPDM is used in the sense of its definition as found in ASTM-D-1418-94 and is intended to mean a terpolymer of ethylene, propylene and a diene monomer with the residual unsaturation portion of the diene in the side chain. Although not limited thereto, illustrative methods for preparing such terpolymers are found in U.S. Pat. No. 3,280,082, the disclosure of which is incorporated herein by reference. Other illustrative methods can be found, for example, in *Rubber and Chemistry & Technology*, Vol. 45, No. 1, Division of Rubber Chemistry (March 1992); Morton, *Rubber Technology*, 2d ed., Chapter 9, Van Nostrand Reinhold Company, New York (1973); *Polymer Chemistry of Synthetic Elastomers, Part 11, High Polymer Series*, Vol. 23, Chapter 7, John Wiley & Sons, Inc. New York (1969); *Encyclopedia of Polymer Science and Technology*, Vol. 6, pp. 367–68, Interface Publishers, a division of John Wiley & Sons, Inc., New York (1967); *Encyclopedia of Polymer Science and Technology*, Vol. 5, p. 494, Interface Publishers, a division of John Wiley & Sons, Inc., New York (1966); and *Synthetic Rubber Manual*, 8th ed., International Institute of Synthetic Rubber Producers, Inc. (1980). The term EPM is used in the sense of its definition as found in ASTM D1418-94 and is intended to mean a copolymer of ethylene and propylene.

The diene monomer utilized in forming the EPDM terpolymer is preferably a non-conjugated diene. Illustrative examples of non-conjugated dienes which may be employed are dicyclopentadiene; alkyldicyclopentadiene; 1,4-pentadiene; 1,4-hexadiene; 1,5-hexadiene; 1,4-heptadiene; 2-methyl-1,5-hexadiene; cyclooctadiene; 1,4-octadiene; 1,7-octadiene; 5-ethylidene-2-norbornene; 5-n-propylidene-2-norbornene; 5-(2-methyl-2-butenyl)-2-norbornene and the like.

The preferred terpolymers of the present invention are substantially amorphous. That is, at least one EPDM terpolymer employed as the base ingredient of the rubber membrane or sheeting material should have less than two percent by weight crystallinity. A preferred elastomeric polymer utilized in the present invention may have from about 55 to about 70 weight percent ethylene and from about 1 to about 12 weight percent diene with the balance of the polymer being propylene or some other similar olefin-type polymer.

It will be appreciated that the subject fire retardant roof sheeting material may comprise 100 parts by weight of an amphorous EPDM as the sole elastomeric polymer for the composition. However, it will be appreciated that more than one EPDM, and optionally, an EPM, having less than 2 percent by weight crystallinity may also be employed, and so long as the overall crystallinity percentage remains at 2 percent or less, even crystalline EPDM or EPM may be employed.

While crystalline and semi-crystalline EPDM and EPM polymers are not required for practice of the present invention, blends of amorphous and semi-crystalline EPDM and EPM may be used to practice this invention, provided the resulting blend of polymers has not more than about 2 percent by weight crystallinity. It will be appreciated that the use of crystalline polymers and/or EPM may slightly decrease the LOI of the resultant composition. Thus, careful attention to the amount of these ingredients used is required.

Semi-crystalline and crystalline EPDM and EPM materials are generally defined as those having at least two percent crystallinity and higher, up to about 13 percent by weight, as is known in the art. Where these materials have higher crystallinity than the amorphous EPDM and/or EPM materials, it is within the present invention to utilize blends with the amorphous materials. Relative amounts of the amorphous and crystalline materials can be varied although the amorphous component will comprise the majority, that is, usually at least 80 percent by weight of the 100 percent by weight amount of EPDM or EPM material. When blends are employed, they should be compounded in relative amounts taking into account their crystallinity in order that the EPDM or EPDM/EPM blends have a crystallinity of less than or up to about two percent by weight, in keeping with the preferred use of amorphous polymer materials.

To be useful in such blends according to the present invention, crystalline EPDM components, if used, will have at least about 2 weight percent crystallinity from the ethylene component; an $\overline{M}n$ as measured by GPC of at least about 30,000 and an $\overline{M}w$, as measured by GPC of at least about 100,000. Similarly, the crystalline EPM, if used, should have at least about 2 weight percent crystallinity (ethylene); an $\overline{M}n$, as measured by GPC of at least about 30,000 and an $\overline{M}w$, as measured by GPC of at least about 100,000. Again, however, amphorous EPDM and, optionally, EPM are employed rather than crystalline components.

A particularly preferred EPDM having less than two percent crystallinity is available from Uniroyal Chemical Co. under the trademark Royalene® and has a Mooney viscosity (ML/4 at 125° C.) of about 47±5, an ethylene content between about 69 or 70 weight percent and about 2.7 weight percent unsaturation.

Another EPDM available from Uniroyal Chemical Co. under the Royalene® tradename is one having a Mooney Viscosity ($ML/_4$ at 125° C.) of about 63; an ethylene content of about 69 weight percent and about 2.5 to 2.7 weight percent of third monomer with the balance of the terpolymer being propylene. This amorphous EDPM terpolymer has less than two weight percent crystallinity and a Mooney Viscosity ($ML/_4$ at 125° C.) of about 62–63. Of course, it will be appreciated that all of the EPDM and EPM base polymers are combustible materials.

In addition to the combustible olefinic polymers such as EPDM and, optionally, EPM, discussed hereinabove, the roofing membrane composition of the present invention may also include fillers, flame retardant packages, processing aids and curatives as well as other optional components including cure activators, all of which are discussed hereinbelow. The amounts of fillers, flame retardants, processing materials, curing agents, and other additives used in the roofing membrane composition will be expressed hereinafter as parts by weight per 100 parts by weight of the base polymer which, in most cases, will be the EPDM terpolymer. Accordingly, where the term "phr" is used, it will be understood to mean parts by weight per 100 parts by weight base polymer.

With respect to the fillers, suitable fillers are selected from the group consisting of combustible and non-combustible materials, and mixtures thereof. However, larger amounts of non-combustible materials and lesser amounts of combustible materials are highly desirable and preferred. Examples of combustible materials include organic materials such as carbon blacks, ground bitiminous coal filler and processing oils. Examples of non-combustible materials include both organic and inorganic materials, but preferably include clay, mineral fillers, and the like. Preferably, these materials can be added to the formulation in amounts ranging from 85 to 175 parts by weight, per 100 parts base polymer and, more preferably, from about 110 to 150 parts by weight, per 100 parts base polymer, with substantially more non-combustible materials being utilized than combustible materials, preferably at a ratio of at least 1.5 to 1 and more preferably, nearly 2 to 1.

Organic combustible materials like carbon black and coal filler may be used in amounts ranging from about 30 parts to about 90 parts per 100 parts of EPDM terpolymer (phr). As carbon black and coal filler are combustible materials, their use should be limited, preferably in amounts ranging from about 40 to about 75 phr.

The carbon black useful herein may be any carbon black suitable for the purposes disclosed hereinbelow. Preferred are furnace blacks such as GPF (general-purpose furnace), FEF (fast-extrusion furnace) and SRF (semi-reinforcing furnace). Most preferred in N650 HiStr GPF black, a petroleum-derived, black reinforcing filler having an average particle size of about 60 nm and a specific gravity of about 1.80 g/cc.

Other combustible materials such as ground coal filler may also be employed as part of the filler in the roofing membrane compositions of the present invention. Ground coal is a dry, finely divided black powder derived from a low volatile bituminous coal. The ground coal typically has a particle size ranging from a minimum of 0.26 microns to a maximum of 2.55 microns with the average particle size of 0.69±0.46 as determined on 50 particles using Transmission Electron Microscopy. The ground coal produces an aqueous slurry having a pH of about 7.0 when tested in accordance with ASTM D-1512. A preferred ground coal of this type is designated Austin Black which has a specific gravity of about 1.255±0.03, an ash content of about 4.58% and a sulfur content of about 0.65%. Austin Black is commercially available from Coal Fillers, Inc. of Bluefield, Va. Amounts range from about 10 to about 35 phr with about 10 to about 20 phr being preferred, if used.

With respect to non-combustible materials, there are many types of materials which can be used as non-combustible fillers for the roofing membrane composition of the present invention. Particularly useful and preferred with respect to non-combustible materials are non-black mineral fillers. These mineral fillers are essentially inorganic materials which generally aid in reinforcement, heat aging resistance, green strength performance, and flame resistance. There are a number of different inorganic materials that fall into this category of fillers. For example, these mineral fillers include a number of different types of clays, including hard clays, soft clays, chemically modified clays, water-washed clays, and calcined clays. Other examples of mineral fillers suitable for use in the present invention include mica, talc, alumina trihydrate, antimony trioxide, calcium carbonate, titanium dioxide, silica, and certain mixtures thereof. Still other inorganics such as magnesium hydroxide and calcium borate ore may also be employed. In some instances, these fillers may completely or partially replace "black" fillers, i.e. carbon black and other petroleum-derived materials. Generally, however, one or more of these mineral fillers are employed in amounts ranging from about 85 parts to about 175 parts by weight, per 100 parts base polymer.

Any of four basic types of clays are normally used as fillers for rubber elastomers. The different types of clay fillers include airfloated, water washed, calcined and surface treated or chemically modified clays.

The airfloated clays are the least expensive and most widely used. They are divided into two general groups, hard and soft, and offer a wide range of reinforcement and loading possibilities. Hard Clays may be used in the amount of about 50 parts to about 150 parts per 100 parts EPDM (phr), preferably in an amount from about 75 to 110 phr, if used. Preferred airfloated hard clays are commercially available from J. M. Huber Corporation under the tradenames Barden R®, and LGB® from Kentucky-Tennessee Clay Company, Koalin Division, Sandersville, Ga., under the tradename Suprex®

The airfloated soft clays may be used in amounts ranging from about 75 parts to about 175 parts per 100 parts of EPDM (phr), preferably in an amount from about 80 to 125 phr, if used. The preferred airfloated soft clays are available from J. M. Huber Corporation under the tradename K-78®, from Evans Clay Company under the tradename Hi-White R® and from Kentucky-Tennessee Clay Company, Koalin Division, Sandersville, Ga., under the tradename Paragon®. Particularly preferred is Hi-White R®, an air-floated soft clay characterized as having a pH of about 6.25±1.25, an oil absorption of 33 grams/100 grams of clay, and a specific gravity of about 2.58. This clay is also finer than two microns.

Water washed clays are normally considered as semi-reinforcing fillers. This particular class of clays is more closely controlled for particle size by the water-fractionation process. This process permits the production of clays within controlled particle size ranges. The preferred amounts of water washed clays are very similar to the preferred amounts of airfloated soft clays mentioned hereinabove. Some of the preferred water washed clays include Polyfil® DL, Polyfil® F, Polyfil® FB, Polyfil® HG-90, Polyfil® K and Polyfil® XB; all commercially available from J. M. Huber Corporation.

The third type of clay includes the calcined clay. Clays normally contain approximately 14 percent water of hydration, and most of this can be removed by calcination. The amount of bound water removed determines the degree of calcination. The preferred ranges of calcined clays are very similar to the preferred amounts of airfloated hard clays mentioned hereinabove. Some of the preferred calcined clays include Polyfil® 40, Polyfil® 70, and Polyfil® 80, all commercially available from J. M Huber Corporation.

The last type of clay includes chemically modified reinforcing clays. Cross-linking ability is imparted to the clay by modifying the surface of the individual particles with a polyfunctional silane coupling agent. Chemically modified clays are used in the amount of from about 50 parts to about 150 parts per 100 parts EPDM (phr), preferably in an amount from about 75 to 125 phr. Normally, the specific gravity of most of these clays is about 2.60 at 25° C. The preferred chemically modified clays are commercially available from J. M. Huber Corporation and include those available under the tradenames Nucap®, Nulok® and Polyfil®. Other preferred chemically modified clays are commercially available from Kentucky-Tennessee Clay Company under the tradenames Mercap® 100 and Mercap® 200.

As an alternative to the clays, a silicate may have utility in the present invention. For example, synthetic amorphous calcium silicates such as those which are commercially available from the J. M. Huber Company under the tradename Hubersorb® may be utilized. One particular silicate, Hubersorb® 600, is characterized as having an average particle size of 3.2 micrometers (by the Coulter Counter Method), oil absorption of 450 ml/100 grams of calcium silicate, a BET (Brunaver-Emmet-Teller nitrogen adsorption procedure) surface area of 300 $m^2$/gram and a pH (5% solution) of 10.

Other silicates which may be used in the composition of the present invention include precipitated, amorphous sodium aluminosilicates available from the J. M. Huber Company under the tradename Zeolex®. Zeolex 23 has a BET surface area of about 75 $m^2$/gram, a refractive index at 20° C. of about 1.51, and a pH of about 10.2 determined by slurring 20 grams of silicate with 80 grams of deionized water. In comparison, Zeolex 80 has a BET surface area of about 115 $m^2$/gram, a refractive index at 20° C. of about 1.55, and a pH of about 7. The average particle size, density, physical form and oil absorption properties are similar to each other.

Reinforcing silicas may also be used as non-black fillers, preferably in conjunction with one or more of the chemically modified clays noted hereinabove. Silica (silicon dioxide) utilizes the element silicon and combines it in a very stable way with two oxygen atoms. Generally, silicas are classed as wet-processed, hydrated silicas because they are produced by a chemical reaction in water, from which they are precipitated as ultrafine, spherical particles. However, there are in reality two different forms of silica, crystalline and amorphous (noncrystalline). The basic crystalline form of silica is quartz, although there are two other crystalline forms of silica that are less common—tridymite and cristobalite. On the other hand, the silicon and oxygen atoms can be arranged in an irregular form as can be identified by X-ray diffraction. This form of silica is classified as amorphous (noncrystalline), because there is no detectable crystalline silica as determined by X-ray diffraction. The most preferred forms of silica, i.e., a fine particle, hydrated amorphous silica, are available from PPG Industries, Inc. and J. M. Huber Corporation in a low dust granular form. These silicas typically are available from PPG Industries under the tradenames HiSil® and Silene®. Reinforcing silicas are generally characterized in terms of surface area ($m^2$/gram by the BET procedure) or particle size as determined by either electron microscopy or the Coulter Counter Method.

These silicas can be employed in the amount of about 10 parts to about 110 parts per 100 parts EPDM terpolymer (phr), preferably in an amount from about 10 to 30 phr. The useful upper range is limited by the high viscosity imparted by fillers of this type.

Still other fillers include calcium carbonate, titanium dioxide, talc (magnesium silicate), mica (mixtures of sodium and potassium aluminum silicate), alumina trihydrate, antimony trioxide, magnesium hydroxide, and calcium borate ore. The amount of these fillers may vary significantly depending upon the number and amount of other particular fillers employed, but typically are employed in amounts ranging from about 20 to about 75 parts by weight, per 100 parts base polymer. Among these mineral fillers, talc is particularly preferred.

One particularly useful form of talc is Mistron Vapor Talc (MVT) commercially available from Luzenac America, Inc. Mistron Vapor Talc (MVT) is a soft, ultra-fine, white platy powder having a specific gravity of 2.75. Chemically, Mistron Vapor Talc is ground magnesium silicate having a median particle size of 1.7 microns, an average surface area of 18 $m^2$/gram and a bulk density (tapped) of 20 lbs/$ft^3$.

Other useful fillers include alumina trihydrate, a finely divided, odorless, crystalline, white powder having the chemical formula $Al_2O_3.3H_2O$. Alumina trihydrate can be utilized in the present invention to enhance the green strength of the EPDM terpolymer or the other polyolefins. Preferably, alumina trihydrate has an average particle size ranging from about 0.1 micron to about 5 microns, and more preferably, from about 0.5 micron to about 2.5 microns.

One preferred ground alumina trihydrate suitable for use with the invention has a specific gravity of about 2.42, and an ash content of about 64–65 weight percent. Alumina trihydrate is commercially available from Franklin Industrial Minerals, of Dalton, Ga. Notably, alumina trihydrate can also be advantageously used separately as a flame retardant and smoke suppressant in the EPDM-based roofing membrane composition of the present invention.

Other sources of alumina trihydrate are available from J. M. Huber Corporation of Norcross, Ga, under the trademark Micral. These alumina trihydrates have a median particle size of about 1.1 microns to about 1.5 microns, a specific gravity of about 2.42, an ash content of about 64–65 weight percent and a loss on ignition at 1000° F. of about 34.65 percent by weight.

Still another useful non-combustible mineral filler suitable for the present invention is the ore of calcium borate. This filler is available in various particle size grades from American Borate Company, Virginia Beach, Va., under the tradename Colemanite® and has the chemical formula $Ca_2B_6O_{11}.5H_2O$. Colemanite has a specific gravity of about 2.4. This ore has an average particle size of about 0.1 to about 5 microns, and more preferably, from about 0.5 micron to about 2.5 microns.

Yet another mineral filler which may be particularly suitable for use in the roofing membrane composition of the present invention is magnesium hydroxide. Magnesium hydroxide $(Mg(OH)_2$ is a finely divided, white powder which is an extremely effective smoke suppressant as well as a flame retardant additive. It is well documented that $Mg(OH)_2$ is highly effective in reducing smoke. Thus, this mineral filler is believed to be particularly useful where smoke and fire resistivity is a concern. To that end, this mineral filler oftentimes will replace other mineral fillers such as silica or any of the clays in the composition.

Commercial grades of magnesium hydroxide are available from Martin Marietta Magnesia Specialties, Inc. under the tradename MagShield. MagShield S is a standard size magnesium hydroxide with a mean particle size of about 6.9 microns. MagShield M has a mean size of about 1.9 microns. Both of these grades of magnesium hydroxide are about 98.5 percent pure, have about 0.3 percent loss on drying and about 30.9 percent by weight loss on ignition, and a specific gravity of about 2.38 at 23° C.

As noted hereinabove, the EPDM-based membrane compositions of the invention further contain fire retardant additives. In general, any fire retardant additives known in the art to be useful in imparting fire retardant properties to EPDM elastomers may be employed in the composition. Thus, fire retardant additives which may be utilized include halogenated aromatic compounds such as the bis-(acryloxyethyl)ether of tetrabromobisphenol-A, decabromodiphenyl oxide and the like; brominated compounds such as brominated ethers, brominated imides and the like; chlorinated polyethylene, hydrated metal oxides such as aluminum trihydrate; and antimony trioxide and zinc borate.

In a preferred embodiment of the present invention, a fire retardant package is added to the composition. There are a variety of fire retardant packages commercially available for use with rubber compositions. Generally, the flame retardant system incorporated into the roofing membrane composition can be made of different types of materials including ratios of decabromodiphenyl oxide (DBDPO) or related bromine containing additives and antimony trioxide. In the preferred fire retardant package, decabromodiphenyl oxide (DBDPO) is combined with antimony trioxide in a ratios of DBDPO:antimony trioxide ranging from about 1:1 to 4:1 with the preferred ratio being 3:1. More generally, amounts of fire retardant additives packages employed in the EPDM composition may range from about 50 to about 80, preferably 50 to 70, parts by weight per 100 parts by weight of polymer.

One particularly useful fire retardant package is available from Anzon Chemical Company. This package is 85 percent active and contains 15 percent by weight EPDM terpolymer as a binder for the package. The package also includes a mixture of antimony trioxide and decabromodiphenyl oxide. It will be appreciated that, where used, these additive packages are employed in amounts ranging from about 50 to about 70 parts by weight, per 100 parts EPDM terpolymer (phr). It will further be appreciated that such a fire retardant package may contain a portion of the EPDM terpolymer employed in the composition.

The roofing membrane composition of the present invention may also contain one or more processing materials. Processing materials are generally included to improve the processing behavior of the composition (i.e. to reduce mixing time and to increase the rate of sheet forming) and includes processing oils, waxes and other similar additives. A process oil may be included in an amount ranging from about 30 parts to about 50 parts process oil per 100 parts EPDM terpolymer (phr), preferably in an amount ranging from about 40 phr to less than about 50 phr and more preferably less than 47 phr. It will be appreciated that this is substantially less processing oil that is used in prior art EPDM-based roof sheeting.

A preferred processing oil is a paraffinic oil, e.g. Sunpar 2280, which is available from the Sun Oil Company. Other petroleum derived oils including naphthenic oils are also useful. Liquid halogenated paraffins may serve as softeners or extenders and are also often desirable as flame retardant additives.

A preferred liquid chlorinated paraffin is Doverguard 5761, which features about 59 weight percent chlorine and can be used both as a softener as well as a fire retardant additive. This liquid paraffin has a viscosity of about 20 poise at 25° C. and a specific gravity of about 1.335 g/cc at 23° C. Another liquid paraffin having utility in this invention is a liquid bromochlorinated paraffin flame retardant additive, i.e., Doverguard 8207A having 30 and 29 weight percent bromine and chlorine, respectively. Doverguard 8207A has a specific gravity of about 1.42 g/cc at 50° C. Both liquid halogenated paraffins are commercially available from Dover Chemical Corporation, a subsidiary of ICC Industries, Inc.

A homogenizing agent may also be added, generally in an amount of less than 10 parts by weight, and preferably, in an amount of about 2 to 5 parts by weight per 100 parts EPDM terpolymer. One particularly suitable homogenizing agent is available in flake and pastille form from Struktol Company under the tradename Struktol 40 MS. The preferred homogenizing agent is composed of a mixture of dark brown aromatic hydrocarbon resins having a specific gravity of about 1.06 g/cc at 23° C.

Yet another type of useful processing aid are the phenolic resins. Phenolic resins are known to provide tack and green strength as well as long term aging properties to the composition. When used, such fillers are typically employed in minor amounts of less than 10 parts by weight, more preferably about 2 to 4 parts by weight, per 100 parts EPDM terpolymer. A preferred phenolic resin is XR-14652A3 having a specific gravity of 1.025 g/cc at 23° C. and is commercially available from Sovereign Chemical Company.

In addition to the above ingredients which are mixed to form a masterbatch in the preferred embodiment, cure activators such as zinc oxide and stearic acid may optionally be added to and made a part of the masterbatch. Amounts of these activators can vary depending upon processing needs, but it is conventional to add about 5 phr zinc oxide and about 1 phr stearic acid to the masterbatch. These cure activators are particularly useful with sulfur cure packages as explained hereinbelow.

The roofing membrane composition may also include a cure package containing a curing agent and at least one organic accelerator in order to effect full crosslinking or curing of the composition prior to its use on a roof. The composition is typically vulcanized for a period of time at an elevated temperature to insure crosslinking. The polymeric composition may be cured using any of several well-known curing agents, but preferably the cure package of the present invention includes sulfur and one or more sulfur vulcanizing accelerators.

Generally, the sulfur/accelerator cure package employed in the roofing membrane composition of the present invention is provided in amounts ranging from about 1.5 to about 10 phr, depending upon the amount of sulfur utilized.

As noted, the sulfur and sulfur-containing cure systems used in the present invention typically include one or more sulfur vulcanizing accelerators. Suitable accelerators commonly employed include, for example, thioureas such as ethylene thiourea, N,N-dibutylthiourea, N,N-diethylthiourea and the like; thiuram monosulfides and disulfides such as tetramethylthiuram monosulfide (TMTMS), tetrabutylthiuram disulfide (TBTDS), tetramethylthiuram disulfide (TMTDS), tetraethylthiuram monosulfide (TETMS), dipentamethylenethiuram hexasulfide (DPTH) and the like; benzothiazole sulfenamides such as N-oxydiethylene-2-benzothiazole sulfenamide, N-cyclohexyl-2-benzothiazole sulfenamide, N,N-diisopropyl-2-benzothiazolesulfenamide, N-tert-butyl-2-benzothiazolesulfenamide (TBBS) and the like; other thiazole accelerators such as (MBT) 2-mercaptobenzothiazole, (MBTS) benothiazole disulfide (MBTS), 2-mercaptoimidazoline, N,N-diphenylguanadine, N,N-di-(2-methylphenyl)-guanadine, 2-mercaptobenzothiazole, 2-(morpholinodithio)benzothiazole disulfide, zinc 2-mercaptobenzothiazole and the like; dithiocarbamates such as tellurium diethyldithiocarbamate, copper dimethyldithiocarbamate, bismuth dimethyldithiocarbamate, cadmium diethyldithiocarbamate, lead dimethyldithiocarbamate, zinc diethyldithiocarbamate, zinc dimethyldithiocarbamate and zinc dibutyldithiocarbamate (ZDBDC).

It should be appreciated that the foregoing list is not exclusive, and that other vulcanizing agents known in the art to be effective in the curing of EPDM terpolymers employed in the polymer blend may also be utilized. For a list of additional vulcanizing agents, see *The Vanderbilt Rubber Handbook,* R T Vanderbilt Co., Norwalk Conn. 06855 (1990). It should also be understood that these sulfur donor-type accelerators may be used in place of the elemental sulfur or in conjunction therewith. Suitable amounts of sulfur to be used in the sulfur cure package can be readily determined by those skilled in the art, and generally range from about 0.25 to 2.0 phr, while the amount of accelerator can also be readily determined by those skilled in the art and generally range from about 1.5 to about 10 phr, depending upon the amount of sulfur, the vulcanizing accelerators selected and the ultimate destination or use of the EPDM-based roofing membrane composition.

Still other vulcanizing systems for the EPDM membrane compositions herein may be readily obtained or developed by those skilled in the polymer vulcanization art without undue experimentation by judicious selection of vulcanizing agents and accelerators from the list of compounds set forth above.

The resultant composition comprising the various ingredients set forth hereinabove include at least 40 percent non-combustible materials, and more preferably, at least about 45 percent non-combustible materials. Thus, not only do the fire retardant additives aid in improving burn resistivity, but also the fact that the amount of combustible materials have been lowered. In particular, it will be appreciated that the composition has relatively low process oil loadings as compared to other EPDM compositions while substantially increasing the amount of non-combustible fillers used in the roofing membrane composition. This combination of high non-combustible materials and fire retardant additives provides for a membrane having an LOI of at least 40 when tested in accordance with ASTM 2863-91.

The compositions of this invention can be prepared by conventional means using conventional rubber compounding equipment such as a Brabender, Banbury, Sigma-blade mixer, two-roll mill, or other mixers suitable for forming viscous, relatively uniform admixtures. Mixing techniques depend on a variety of factors such as the specific types of polymers used, and the fillers, processing oils waxes and other ingredients used. The ingredients can be added together in a single shot, loaded with the fillers, oils, etc. going in first and the polymer is added last, or in a more conventional manner with the polymer added first, depending on the actual ingredients used.

Mixing cycles generally range from about 3 to 6 minutes. Better mixing is generally attained by an incremental procedure in which the rubber and part of the fillers are added first with little or no oil, with the remaining fillers and oil being added in additional increments. Rapid mixing and good dispersion can also be achieved by adding part of the EPM or EPDM on top of the fillers, plasticizers, etc. This procedure can be further modified by withholding part of the oil which is then added incrementally.

The sulfur cure package (sulfur/accelerator) is typically added near the end of the mixing cycle and at lower temperatures to prevent premature crosslinking of the EPDM polymer. When utilizing a type B Banbury internal mixer, in a preferred mode, the dry or powdery materials such as the non-black mineral fillers (i.e., untreated clay, treated clays, talc, mica, and the like) of the present invention are added first, followed by the liquid process oil and finally the polymer (this type of mixing can be referred to as an upside-down mixing technique), Two-stage mixing can be employed when better filler dispersion is desired. The rubbery composition can then be formed into a sheet via calendering. The compositions of the invention can also be formed into various types of articles using other techniques such as extrusion.

The resultant rubbery compositions may be prepared in sheet form in any known manner such as by calendering or extrusion and then cutting the sheet to the desired dimensions. Generally, the resulting admixture is sheeted to thickness ranging from 5 to 200 mils, preferably from 35 to 60 mils by conventional sheeting methods, for example, milling, calendering or extrusion. Preferably, the admixture is sheeted to at least 40 mils (0.040-inches) which is the minimum thickness specified in manufacturing standards established by the Roofing Council of the Rubber Manufacturers Association (RMA) for non-reinforced EPDM rubber sheets for use in roofing applications. In many cases, the admixture is sheeted to a thickness of 40–45 mils, since this is the thickness for a large percentage of "single-ply" roofing membranes used commercially. The sheeting can be visually inspected and cut to the desired length and width dimensions after curing.

It will also be appreciated that the roof sheeting material of the present invention can be optionally reinforced with scrim as is well known in the art. However, scrim-reinforcement is not necessary and could be undesirable in some roofing applications.

The roof sheeting membranes are typically evaluated for physical properties using test methods developed for mechanical rubber goods. Typical properties include, among others, tensile strength, modulus, ultimate elongation, tear resistance, ozone resistance, water absorption and cured compound hardness.

In addition, the burn resistivity of the resultant roof sheeting material is evaluated. It has been found that the roof sheeting material has significantly improved burn resistivity as compared to other sheeting materials. In fact, the roof sheeting material of the present invention has a limiting oxygen index of 40. Therefore, the resultant sheeting material can be applied to roofs of high slopes, i.e., those roofs having inclines of at least 1 inch per linear foot. Previously, no EPDM-based sheeting material has provided such improved burn resistivity.

The method for covering a roof is practiced by utilizing an EPDM-based roof sheeting material as described herein. As the sheet is unrolled over the roof substructure in an otherwise conventional fashion, the seams of adjacent sheet layers are overlapped. The width of the seam can vary depending on the requirements specified by the architect, building contractor or roofing contractor and thus, do not constitute a limitation of the present invention. Seams are joined with conventional adhesives such as, for instance, a butyl-based lap splice adhesive commercially available from Firestone Building Products Company as SA-1065. Application can be facilitated by spray, brush, swab or other means known in the art.

Also, field seams can be formed using tape and companion primer such as Quick Seam tape and Quick Prime primer, both of which are commercially available from Firestone Building Products Company of Carmel, Ind.

In order to demonstrate practice of the present invention, a fire retardant black EPDM composition according to the present invention was prepared and subjected to physical testing. The particular roof sheeting composition contained about 45 percent non-combustible materials. The composition and physical testing results are provided in TABLE I hereinbelow.

TABLE I

Scrim-Reinforced (SR)-Fire Retardant (FR) Black EPDM Compound

| Example | parts per 100 parts polymer |
|---|---|
| EPDM[1] | 91.52 |
| Carbon Black[2] | 46.0 |
| Coal Filler[3] | 16.26 |
| Process Oil[4] | 45.0 |
| Talc[5] | 27.09 |
| Untreated Soft Clay[6] | 95.0 |
| Fire Retardant Package[7] | 56.62 |
| Zinc Oxide | 5.0 |
| Stearic Acid | 1.48 |
| Sulfur | 0.90 |
| Accelerator[8] | 2.10 |
| Phenolic Resin[9] | 3.50 |
| TOTAL | 390.47 |

[1]Amorphous EPDM available under the tradename Royalene ®
[2]N-650 Hi Str GPF Black
[3]Finely ground bitiminous coal filler having a specific gravity of 1.255
[4]Sunpar 2280
[5]Mistron Vapor Talc (MVT)
[6]HiWhite R Clay
[7]Fyrebloc 1DB-385R3
[8]Benzothiazyl disulfide
[9]p-Octylphenol resin having a specific gravity of 1.025 g/cc at 23° C. Available in amber flake form from Sovereign Chemical Company.

| Rheometer at 160° C.-mini-die, 3° Arc | |
|---|---|
| Scorch time, minutes:seconds | 10:03 |
| Time to 50% cure, minutes:seconds | 17:50 |
| Time to 90% cure, minutes:seconds | 26:32 |
| Minimum torque, lb.-inch | 8:45 |
| Maximum torque, lb.-inch | 26:75 |
| Mooney Scorch at 135° C.-large rotor | |
| Minimum Viscosity, Mu | 44.3 |
| $T_5$, minutes | 43.9 |
| Stress-Strain Properties at 23° C. - Slabs cured 30 minutes at 160° C. | |
| Unaged | |
| 100% Modulus, psi | 445 |
| 300% Modulus, psi | 630 |
| Tensile at break, psi | 1140 |
| Elongation at break, % | 850 |
| Heat Aged 28 Days at 116° C. | |
| 100% Modulus, psi | 970 |
| 300% Modulus, psi | 1230 |

TABLE I-continued

Scrim-Reinforced (SR)-Fire Retardant (FR) Black EPDM Compound

| | |
|---|---|
| Tensile at break, psi | 1365 |
| Elongation at break, % | 400 |
| Die C Tear Properties at 23° C. - Slabs cured 30 minutes at 160° C. Unaged | |
| Lbs./Inch | 231 |
| Heat Aged 28 Days at 116° C. | |
| Lbs./Inch | 198 |
| Shore "A" Hardness | |
| Unaged - Tested at 23° C. | 72 |
| Heat Aged 28 Days at 116° C. - Tested at 23° C. | 83 |
| Specific Gravity (calc.) | 1.4186 |
| Limiting Oxygen Index (% oxygen) | 40.9 |

Most notable among the physical properties of the preferred membrane composition (the "Example") is the LOI of 40.9 percent oxygen for the rubbery composition. This "high slope" roofing membrane composition has significantly improved burn resistivity as compared to other EPDM-based membrane compositions.

The Oxygen Index Test uses a vertical glass tube 60 cm high and 8.4 cm in diameter, in which a rod or strip is held vertically by a clamp at its bottom end. A controlled mixture of oxygen and nitrogen is metered into the bottom of the tube through a bed of glass beads at the bottom to provide uniform flow of the gases. The sample is ignited at its upper end and the sample burns like a candle from the top down. The atmosphere which allows continuous burning is determined as Oxygen Index (O.I.). The O.I. is the minimum fraction of oxygen in the oxygen-nitrogen mixture which will just sustain burning for two inches or three minutes, whichever occurs first.

In the Example, the EPDM-based membrane composition featured 100% of an essentially amorphous EPDM available under the tradename Royalene®, two different black-type fillers (i.e., N-650 Histr GPF carbon black and coal filler), two different mineral fillers (i.e., HiWhite R soft clay and Mistron Vapor Talc) in an amount almost double that of the black fillers, a processing oil (Sunpar 2280), a fire retardant package, 85% active, containing 15 weight percent EPDM terpolymer which terpolymer is calculated as part of the base polymer, thereby totaling 100 parts EPDM, and rest of the package containing 63.75 weight percent decabromodiphenyl oxide (DBDPO) and 21.25 weight percent antimony trioxide ($Sb_2O_3$). Zinc oxide and stearic acid, as well as a sulfur cure package and a phenolic tackifying resin, were also added to the composition.

The cure characteristics and scorch measurements involving Example 1 were determine and provided in Table I. The cure characteristics of the fully compounded fire retardant composition were determined by means of a Monsanto Oscillating Disc Rheometer (ASTM D 2084-81). The specific conditions employed involved using a mini-die attachment operating at 100 rpm, and the effecting of a 3° arc at 160° C. (320° F.) during testing. The compound processing characteristics of the fire retardant composition were measured using a Monsanto Viscometer (MV-2000E). The specific test conditions involved using a large rotor (1.5 inches in diameter) die attachment operating at 135° C. (275° F.) during actual testing. The Mooney Viscometer provided useful information involving the compound viscosity and processing (scorch) safety of the fully compounded fire retardant composition. The cure properties and processing safety of the fire retardant composition were measured and have been reported in Table I hereinabove. For testing purposes, dumbbell-shaped specimens were cut from individual 45 mil thick slabs (compression molded 30 minutes at 160° C.) according to ASTM D 412 (Method A-dumbbell and straight specimens). Modulus, tensile strength and elongation at break measurements were obtained using a table model Instron® Tester, Model 4301, and the test results were calculated in accordance with ASTM D 412. All dumbbell-shaped specimens were allowed to set for about 24-hours, following which testing was carried out at 23° C.

The tear properties of the 45 mil cured flat rubber slabs were prepared using a die C (90° angle die) and determined in accordance with ASTM D 624. The die C tear specimens were not nicked prior to testing. Tear resistance, in lbs./inch, was obtained using a table model Instron® tester, Model 4301 and the test results were calculated in accordance with ASTM D 624. Testing was carried our at 23° C. Shore "A" hardness testing was conducted at 23° C. in accordance with ASTM D 2240 using a Durometer Type A hardness instrument produced by Shore Instrument & Manufacturing Company, Inc., Freeport, N.Y. The thermal stability of the sulfur crosslinks were determined by exposing the cure 45 mil thick slabs to dry heat in a forced air oven for 28 days at 116° C. Compared to the original or unaged tensile strength, elongation at break and die C tear resistance, the fire retardant composition was found to have excellent thermal stability when aged for 28 days at 116° C. (see Table I). The unaged and heat aged physical properties of the fire retardant composition are presented in Table I hereinabove. The heat aged physical properties and LOI measurement reveal that this particular composition is well suited for use as a fire retardant compound.

The thermal stability of the sulfur crosslinks were determined by exposing the cured rubber vulcanizates to dry heat in a forced air oven for 28 days at 116° C. Compared to the original or unaged tensile at break and die C tear properties, the heat aged vulcanizates were found to have excellent thermal stability when aged for 28 days at 116° C. (see Table 1).

TABLE II

Scrim-Reinforced (SR) - Fire Retardant (FR) Black EPDM Membrane

| Aging Conditions | Unaged | Heat Aged 28 Days at 116° C. |
|---|---|---|
| Breaking Strength at 23° C. | | |
| Lbf. (machine direction) | 367 | 463 |
| Lbf. (cross direction) | 373 | 457 |
| Tongue Tear at 23° C. | | |
| Lbf. (machine direction) | 62.4 | 28.2 |
| Lbf. (cross direction) | 61.3 | 30.8 |
| Rubber Ply-to-Ply Adhesion at 23° C. | | |
| Lbs./Inch (machine direction) | 11.2 | 8.0 |
| Lbs./Inch (cross direction) | 9.90 | 7.6 |
| Shore "A" Hardness | | |
| Tested at 23° C. | 72 | 82 |

A sample of factory produced scrim-reinforced (SR)-fire retardant (FR) EPDM membrane (formulation identified as Example 1 in Table I) was tested for breaking strength and tongue tear resistance as well as rubber ply-to-ply peel adhesion and Shore "A" hardness (see Table II). These tests were performed on samples of membrane, both before and after heat aging 28 days at 116° C. Breaking strength was determined on four by six-inch specimens in accordance with ASTM D 751 (Grab Test Method). These specimens were pulled using an Instron® Tester, Model 4301 at a crosshead speed of 12 inches per minute at 23° C. After 28 days aging at 116° C. the breaking strength of the scrim-reinforced (SR)-fire retardant (FR) EPDM membrane continued to increase in strength in both the machine and cross (transverse) direction. In other words, heat aging did not appear to negatively influence the breaking strength of the 60 mil scrim-reinforced membrane. Samples tested in the machine direction were directionally parallel to the calender roll grain, while test specimens prepared and tested in the cross or transverse direction were directionally perpendicular to the direction of the calender roll grain. Tongue tear resistance of the scrim-reinforced (SR)-fire retardant (FR) EPDM membrane was determined on three by eight-inch specimens using the Tongue Tear Test—Method B which can be found in ASTM D 751. The tongue tear test specimens were pulled using an Instron® Tester, Model 4301 at the rate of two inches per minute crosshead speed.

Adhesion between the two rubber plies was evaluated using an Instron® peel test. The rubber plies were separated using an Instron® Tester, Model 4301 at the rate of two inches per minute on one-inch wide test specimens, both before and after hear aging 28 days at 116° C. Compared to the unaged or original peel adhesion values, the amount of adhesion retained, in lbs. per inch, after 28 days aging at 116° C. was between 71–77%. Lastly, Shore "A" hardness testing was conducted at 23° C. in accordance with ASTM D 2240. Cured compound hardness values were typical of highly mineral filled, fire retardant compositions.

In addition to the above tests, roof sheeting materials prepared from the membrane composition listed in TABLE I were subjected to testing by Underwriter's Laboratory under fire testing standard UL-790 in a high slope environment, i.e., a slope inclined or greater than 1 inch per linear foot. The roof sheeting material was then adhered to half-inch wood fiber board which was covering 4 inches of isocyanurate foam insulation which were installed on a 40-inch wide by eight-foot long deck. This is an industry standard test conducted over 10 minutes with a flame temperature of 760° C.±10° C. and a wind velocity of 12 mph±0.5 mph. The deck is ignited and the spread of the flame over the membrane must be less than six feet in 10 minutes. The roofing materials based on the Example passed the burn test (UL-790).

In conclusion, it should be clear from the foregoing example and specification disclosure that the use of amorphous EPDM terpolymers or blends of amorphous and semi-crystalline EPDM terpolymers having a combined crystallinity of up to about 2 percent by weight can be used to prepare roof sheeting material with good seaming and physical properties as well as improved burn resistivity for high slope applications.

It is to be understood that the invention is not limited to the specific example provided hereinabove or to specific types of amorphous EPDM terpolymers exemplified herein or by the disclosure of other typical processing additives or fillers as provided herein, the example having been provided merely to demonstrate the practice of the subject invention. Similarly, the invention is not necessarily limited to the particular fillers, processing material, and additives exemplified or the amounts thereof. Those skilled in the art may readily select other amorphous terpolymers (and copolymers), or fillers, processing aids and the like according to the disclosure made hereinabove.

In view of the properties described above, the compositions of the present invention are valuable in the production of roofing membranes. Roofing membranes formed from the compositions of the present invention may be produced by any method conventionally used for producing roofing membranes from filled polymeric compositions. For example, the membranes may be formed by a conventional calendering technique. As noted hereinabove, roofing membranes formed from the compositions of the present invention may optionally be scrim reinforced.

Thus, it is believed that any of the variables disclosed herein can readily be determined and controlled without departing from the scope of the invention herein disclosed and described. Moreover, the scope of the invention shall include all modifications and variations that fall within the scope of the attached claims.

What is claimed is:

1. A fire retardant roof sheeting membrane for sloped roofs having an incline of at least 1 inch per linear foot, formed from a composition comprising:
   a base polymer containing at least one ethylene-propylene-diene terpolymer, said base polymer having up to about 2 percent by weight crystallinity;
   from about 85 to about 175 parts by weight of at least one non-combustible mineral filler per 100 parts of said base polymer;
   from about 30 to about 50 parts by weight of a processing material, per 100 parts of said base polymer;
   from about 50 to about 80 parts by weight of at least one fire retardant additive, per 100 parts of said base polymer, wherein said fire retardant additive includes at least a bromine-containing additive and antimony trioxide ($Sb_2O_3$); and
   from about 1.5 to about 10 parts by weight of a cure package per 100 parts of said base polymer, the sheeting membrane composition containing at least 40 percent non-combustible materials, being calenderable for use on a roof, having a limiting oxygen index (LOI) of at least 40 percent oxygen when tested in accordance with ASTM D2863-91, and capable of passing the UL-790 Test for Fire Resistance of Roof Covering Materials for sloped roofs having an incline of at least 1 inch per linear foot.

2. The fire retardant roof sheeting membrane as set forth in claim 1, further comprising about 30 to 90 parts by weight of at least one black filler, per 100 parts of said base polymer.

3. The fire retardant roof sheeting membrane as set forth in claim 1, wherein said base polymer further contains a second ethylene-propylene-diene terpolymer.

4. The fire retardant roof sheeting membrane as set forth in claim 1, wherein said base polymer further contains a polymer forming a mixture with said at least one terpolymer wherein said polymer forming said mixture is selected from the group consisting of copolymers prepared from monomers containing at least 2 carbon atoms, blended in relative proportions with said terpolymer so that the overall crystallinity of said base polymer is up to about 2 percent by weight.

5. The fire retardant roof sheeting membrane as set forth in claim 1, wherein said non-combustible mineral filler is selected from the group consisting of hard clays, soft clays, chemically modified clays, mica, talc, alumina trihydrate, calcium carbonate, titanium dioxide, amorphous precipitated hydrated silica and mixtures thereof.

6. The fire retardant roof sheeting membrane as set forth in claim 5, wherein said non-combustible mineral filler includes soft clays and talc.

7. The fire retardant roof sheeting membrane as set forth in claim 1, wherein said processing material is selected from the group consisting of paraffinic oils, naphthenic oils and waxes and mixtures thereof.

8. The fire retardant roof sheeting membrane as set forth in claim 1, wherein said bromine-containing additive is decabromodiphenyl oxide (DBDPO).

9. The fire retardant roof sheeting membrane as set forth in claim 1, wherein said cure package comprises from about 0.5 to about 2 parts by weight sulfur and from about 1 to about 8 parts by weight of at least one sulfur vulcanizing accelerator.

10. The fire retardant roof sheeting membrane as set forth in claim 9, wherein said at least one sulfur vulcanizing accelerator includes a benzothiazyl disulfide.

11. The fire retardant roof sheeting membrane as set forth in claim 1, wherein the sheeting material contains about 45 percent non-combustible materials.

12. A sloped roof having an incline of at least 1 inch per linear foot, comprising the roof sheeting membrane of claim 1.

13. The fire retardant roof sheeting membrane as set forth in claim 1, wherein said membrane is scrim-reinforced.

14. A method for covering sloped roofs having an incline of at least 1 inch per linear foot comprising:
    applying layers of roof sheeting material prepared from a fire retardant polymeric composition of matter to the roof being covered, said polymeric composition of matter comprising a base polymer containing at least one ethylene-propylene-diene terpolymer, said base polymer having up to about 2 percent by weight crystallinity; from about 85 to about 175 parts by weight of at least one non-combustible mineral filler per 100 parts of said base polymer; from about 30 to about 50 parts by weight of a processing material, per 100 parts of said base polymer; from about 50 to about 80 parts by weight of at least one fire retardant additive, per 100 parts of said base polymer, wherein said fire retardant additive includes at least a bromine-containing additive and antimony trioxide ($Sb_2O_3$); and from about 1.5 to about 10 parts by weight of a cure package per 100 parts of said base polymer;

overlapping adjacent edges of said layers; and adhesively seaming the overlapped areas to form an acceptable seam, said composition of matter containing at least 40 percent non-combustible materials and said sheeting material having a limiting oxygen index (LOI) of at least 40 percent oxygen when tested in accordance with ASTM D2863-91, and capable of passing the UL-790 Test for Fire Resistance of Roof Covering Materials for sloped roofs having an incline of at least 1 inch per linear foot.

15. The method as set forth in claim 14, wherein said composition of matter further comprises about 30 to 90 parts by weight of at least one black filler, per 100 parts of said base polymer.

16. The method as set forth in claim 14, wherein said at least one non-combustible mineral filler is selected from the group consisting of hard clays, soft clays, chemically modified clays, mica, talc, alumina trihydrate, calcium carbonate, titanium dioxide, amorphous precipitated hydrated silica and mixtures thereof.

17. The method as set forth in claim 14, wherein said bromine-containing additive is decabromodiphenyl oxide (DBDPO).

18. The method as set forth in claim 14, wherein said cure package comprises from about 0.5 to about 2 parts by weight sulfur and from about 1 to about 8 parts by weight of at least one sulfur vulcanizing accelerator.

19. The method as set forth in claim 18, wherein said at least one sulfur vulcanizing accelerator includes a benzothiazyl disulfide.

20. The method as set forth in claim 14, wherein said composition of matter contains about 45 percent non-combustible materials.

* * * * *